(12) United States Patent  (10) Patent No.: US 9,369,332 B1
Smith et al.  (45) Date of Patent: Jun. 14, 2016

(54) IN-MEMORY DISTRIBUTED CACHE

(71) Applicant: Amazon Technologies, Inc., Seattle, WA (US)

(72) Inventors: Patrick Devere Smith, Seattle, WA (US); Zachary Ganwise Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 13/778,395

(22) Filed: Feb. 27, 2013

(51) Int. Cl.
G06F 15/16 (2006.01)
H04L 29/08 (2006.01)

(52) U.S. Cl.
CPC .................. *H04L 29/0881* (2013.01)

(58) Field of Classification Search
CPC .................. H01L 67/2885; H01L 67/1097
USPC ................... 709/214, 216, 217–219
See application file for complete search history.

(56) References Cited

U.S. PATENT DOCUMENTS

| | | | | |
|---|---|---|---|---|
| 6,145,056 | A * | 11/2000 | Heydon et al. | 711/129 |
| 6,453,404 | B1 * | 9/2002 | Bereznyi | G06F 12/023 711/119 |
| 7,676,554 | B1 * | 3/2010 | Malmskog et al. | 709/219 |
| 7,979,509 | B1 * | 7/2011 | Malmskog et al. | 709/219 |
| 8,234,348 | B1 * | 7/2012 | Tulchinsky et al. | 709/214 |
| 2007/0174420 | A1 * | 7/2007 | Khusial et al. | 709/217 |
| 2009/0055468 | A1 * | 2/2009 | Burckart | H04L 67/2842 709/203 |
| 2009/0144404 | A1 * | 6/2009 | Wolman | G06F 9/5083 709/223 |
| 2009/0300096 | A1 * | 12/2009 | Koonce | H04L 67/2857 709/203 |
| 2011/0137888 | A1 * | 6/2011 | Yoo | G06F 17/30902 707/713 |
| 2013/0219021 | A1 * | 8/2013 | Acharya | H04L 29/08729 709/219 |
| 2013/0246564 | A1 * | 9/2013 | Lee | H04L 67/2842 709/217 |

OTHER PUBLICATIONS

"Memcached", Wikipedia [online][retrieved on Jan. 9, 2013]retrieved from: http://en.wikipedia.org/wiki/Memcached, 5 pps.
Web homepage: Memcached [online][retrieved on Jan. 8, 2013] retrieved from: www.memcached.org, 3 pps.
Article: "Stash" [online[retrieved on Jan. 9, 2013] retrieved from: http://nate.io/stash/ , 5 pps.

* cited by examiner

*Primary Examiner* — Ruolei Zong
(74) *Attorney, Agent, or Firm* — Lee & Hayes, PLLC (57) ABSTRACT

Improved caching mechanisms are presented herein for use with an in-memory distributed cache and, potentially, other types of caches. One mechanism permits cache clients to wait on a cache key being fetched by one or more other cache clients. When the cache key arrives at the cache, the waiting cache clients may be called back with the cache key. Another mechanism allows a service to push changed values directly into a distributed cache. Yet another mechanism allows the storage of information in a cache that defines dependencies between cached values. The dependency information can be utilized to invalidate cache values that are dependent upon other cached values that have been invalidated.

20 Claims, 10 Drawing Sheets

IN-MEMORY DISTRIBUTED CACHE

BACKGROUND

Large-scale dynamic World Wide Web ("Web") sites commonly implement an in-memory distributed cache to improve application performance. An in-memory distributed cache utilizes a collection of distributed cache nodes that store data in memory for fast retrieval. For example, a Web application might utilize an in-memory distributed cache to cache the results of a call to a Web service. If another instance of the Web application needs the results of the same call, the second instance of the Web application can retrieve the results from the in-memory distributed cache, rather than performing a second call to the Web service.

Because the in-memory distributed cache stores the results of the call to the Web service in main memory, the cache will be able to return the results to the Web application much more quickly than the Web service. Moreover, because a second call to the Web service is avoided, the processing load on the Web service is reduced. However, although an in-memory distributed cache can improve application performance in many implementations, there are still scenarios where the operation of an in-memory distributed cache may be improved for even greater application performance.

It is with respect to these and other considerations that the disclosure made herein is presented.

DETAILED DESCRIPTION

The following detailed description is directed to technologies for improving the operational performance of an in-memory distributed cache. Through an implementation of the technologies disclosed herein, cache clients can retrieve values from an in-memory distributed cache more quickly in certain common scenarios than in previous cache implementations.

According to one embodiment disclosed herein, an in-memory distributed cache is provided that includes multiple cache nodes. Each of the cache nodes is configured to execute a cache server component that implements the functionality of the distributed cache. The cache server component is configured to expose various application programming interface ("API") methods to cache clients that utilize the distributed cache. In one embodiment, for example, the methods exposed by the cache server include a "cache get" method, a "claim fetching" method, a "cache add" method, and a "cache wait" method. The cache server might also expose other methods for use by the cache clients.

The cache get method allows a cache client to request a value from the in-memory distributed cache. In order to request the value, the requesting cache client provides a key to the cache server as a part of the call to the cache get method. If the specified key has an associated value in the cache, the cache server returns the value stored in the cache to the cache client in response to the request. If the specified key does not have an associated value stored in the cache, the cache server determines whether a predefined, and possibly user-configurable, number of cache clients have previously indicated that they are fetching the requested value. As will be described in greater detail below, the cache server might expose a claim fetching method through which a cache client can provide such an indication.

If the cache server determines that the required number of cache clients have not indicated that they are fetching the requested value, then the cache server returns a null value in response to the request, thereby indicating to the calling cache client that the requested value is not stored in the distributed cache. If, however, the cache server determines that the required number of cache clients have indicated that they are fetching the requested value, the cache server provides an indication in response to the request that the cache client can wait for the requested value to become available in the distributed cache.

If the cache client decides to wait for the requested value, the cache client might then call the cache wait method exposed by the cache server. When the cache server receives a call to the cache wait method, the cache server adds the identity of the cache client to a list, or other type of data structure, utilized to store data identifying each of the cache clients that are waiting for the requested value. As will be described in detail below, the cache server may call the cache client back with the requested value when another cache client adds the value to the distributed cache.

If the cache client decides to fetch the requested value, rather than to wait for the value to appear in the distributed cache, the cache client may call the claim fetching method exposed by the cache server. In response to receiving such a call, the cache server increments a variable utilized to keep track of the number of cache clients that have indicated that they are fetching the value. As discussed above, until this variable reaches a predefined value, a null value will be returned to cache clients requesting the same value. After the variable has reached the predefined value, cache clients will be permitted to wait on the requested value. By requiring a certain number of cache clients to indicate that they are fetching the cache value prior to permitting other cache clients to wait, the cache server can increase the likelihood that at least one of the fetching clients will in fact add the value to the distributed cache.

When a cache client calls the cache add method, the cache server adds a specified key and value to the distributed cache. The cache server also examines the list of waiting clients to determine whether any cache clients are waiting on the value just added to the cache. If so, the cache server provides the value to each of the waiting clients. For example, the cache server might call back each of the waiting clients with the newly added value. Additionally, the cache server clears the list of cache clients waiting on the value and resets the variable utilized to keep track of the number of cache clients that are fetching the value.

According to another embodiment disclosed herein, a service is configured to expose a "push to cache" method through which a caller can request that a value for a specified key be updated in a cache if the value changes. For example, an application might request and receive a value from a Web service. The application might then cause the received value to be stored in a cache, such as an in-memory distributed cache, utilizing an appropriate mechanism, such as the cache add method described above.

The application might also request that the service directly update the value stored in the cache if the value changes. In order to perform this functionality, the application calls the push to cache method exposed by the service with the value and its associated cache key. The request might also include a node ID that identifies the node in the cache storing the key and a time to live ("TTL") value specifying a lifetime for the request.

When the service receives the call to the push to cache method, it stores the cache key, the value, the node ID, and the TTL value if provided. The service then periodically determines whether the value has changed. For example, the service might periodically recompute the value, retrieve the value from another service or system, or perform other types of processing in order to determine whether the value originally supplied in the request has changed. The service might also register for and receive an event indicating that the value has changed.

If the service determines that the value has changed, the service then causes the value previously stored in the cache to be updated with the changed value. For example, the service might call an update key method on the cache to submit the changed value. This process may continue until the specified TTL for the request has expired. In this way, the application can avoid having to retrieve the updated value from the service and re-store the value in the cache in the event of a cache miss.

According to another embodiment disclosed herein, a mechanism is provided for relational caching. In this embodiment, cache keys are stored along with information describing any dependencies between the cache keys. When a cache key is invalidated, such as based upon an associated TTL value, the stored dependency information may be utilized to invalidate other cache keys that are dependent upon the invalidated cache key. Storing and invalidating cache keys in this way may avoid unnecessary service calls in certain implementations. Additional details regarding these and other aspects of the embodiments disclosed herein will be provided below with regard to FIGS. 1-12.

It should be appreciated that the embodiments disclosed herein might be utilized with any type of computer, computing system, device, application program, operating system, or other type of system or component. In particular, while the embodiments disclosed herein are discussed primarily in the context of an in-memory distributed cache, various aspects of the embodiments disclosed herein might also be utilized with other types of distributed and non-distributed caching mechanisms. It should also be appreciated that the various caching mechanisms described above, and in more detail below, may be utilized independently or in combination with one another. Further, it should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that various aspects of the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
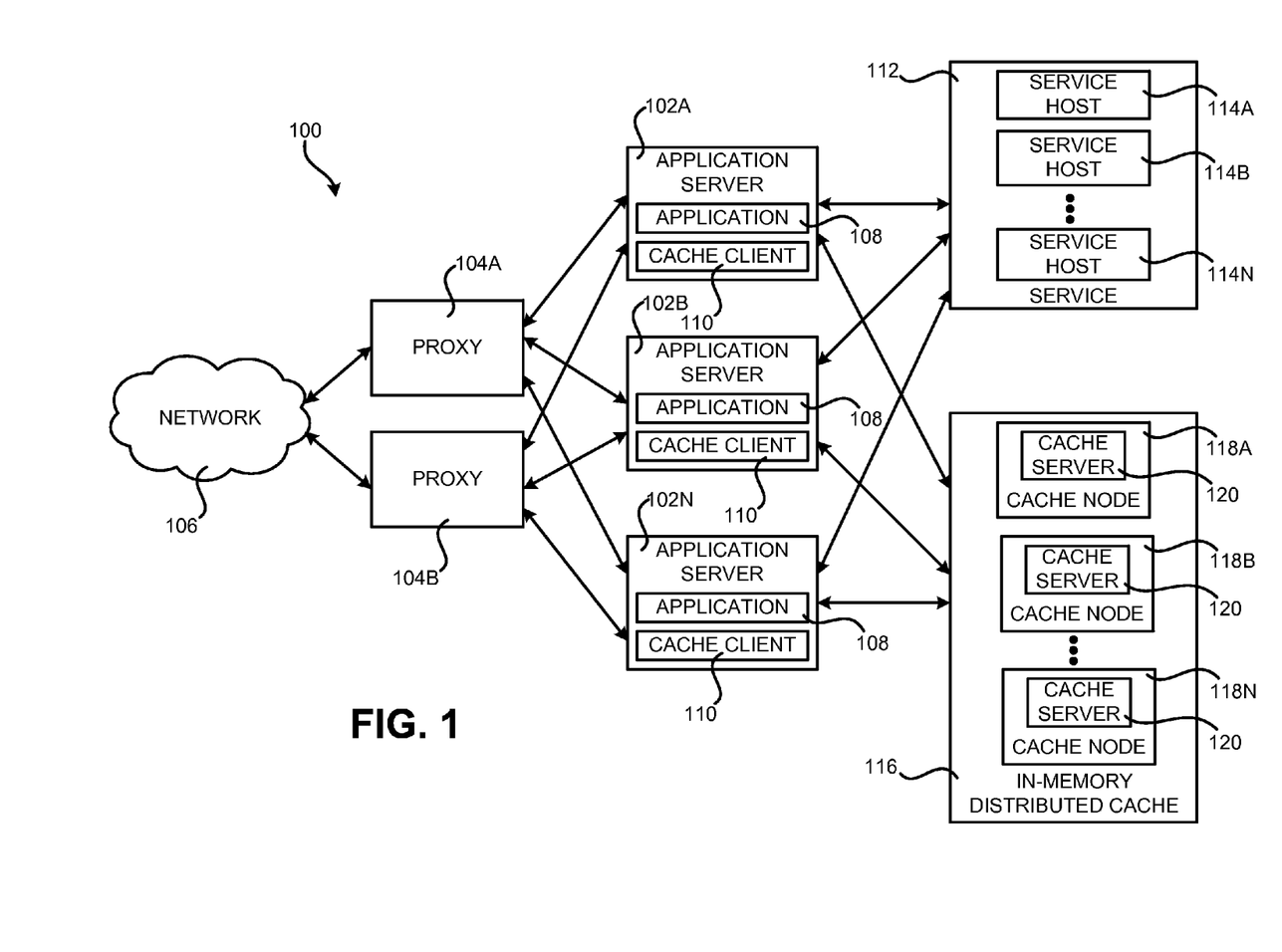
FIG. 1 is a network and computer system diagram showing one illustrative operating environment for the embodiments disclosed herein.

FIG. 1 is a network and computer system diagram showing one illustrative operating environment 100 for the embodiments disclosed herein. As shown in FIG. 1, the operating environment 100 includes an in-memory distributed cache 116. As known to those skilled in the art, a distributed cache 116 might be implemented using multiple cache nodes 118A-118N. Each of the cache nodes 118 stores a portion of the cache in its main memory. Because each cache node 118 stores a portion of the cache in its main memory, access can be had to the contents of the cache faster than if the cache were stored on disk.

In order to provide this functionality, each of the cache nodes 118 is configured to execute a cache server module 120 that controls the operation of the cache node 118. The cache server module 120 might expose various methods that can be called by cache clients 110 to store data in the cache, update data previously stored in the cache, retrieve data from the cache, and to perform other functions. Details regarding various aspects of the operation of the cache server module 120 will be provided below.

As also illustrated in FIG. 1, the distributed cache 116 might be utilized in conjunction with an implementation of a large scale dynamic Web site. In particular, aspects of the operation of such a Web site might be implemented by instances of a Web application 108 executing on a multitude of application servers 102A-102N. A number of proxies 104A and 104B, load balancers (not shown), and other types of networking devices might be utilized to connect the application servers 102A-102N to a network 106, such as the Internet. Clients might submit requests to the application servers 102A-102N by way of the network 106.

In order to obtain dynamically generated data, the various instances of the application 108 might utilize one or more backend services, such as the service 112. For example, the instances of the application 108 might utilize database services and other types of services in order to generate various types of objects. A number of service hosts 114A-114N might be utilized to implement each service. The service hosts 114 might be hardware devices and/or virtual machine instances. Although only a single service 112 has been illustrated in FIG. 1, it should be appreciated that many services 112 might be utilized in other implementations.

Each of the application servers 102 might also be configured with a cache client component 110 for managing data stored in the distributed cache 116 by each of the instances of the application 108. The cache client 110 is configured for communication with the cache server component 120 executing on the cache nodes 118. In one implementation, the cache client 110 is implemented as a set of libraries that enable communication with the cache nodes 118 of the distributed cache 116. The instances of the application 108 can call the libraries to perform cache-related functions. For example, and as will be described in greater detail below, the cache client 110 can be utilized to store objects in the distributed cache 116, retrieve objects from the distributed cache 116, and to perform other functions.

In order to enable communication with the distributed cache 116, each of the cache clients 110 is configured with the identity of each of the cache nodes 118. The cache nodes 118, however, do not typically communicate with one other. If a cache client 110 wishes to set or read a value corresponding to a certain key, the cache client 110 first computes a hash of the key to identify the particular cache node 118 that will be used to store the value. The cache client 110 then communicates with the cache server 120 on the identified cache node 118 to read or store the desired value. Because all of the cache clients 110 use the same hashing algorithm to identify cache nodes 118, each cache client 110 can read data stored in the distributed cache 116 by the other cache clients 110.

As mentioned briefly above, the cache nodes 118 keep stored values in random-access memory ("RAM"). If a cache node 118 runs out of RAM, it will typically discard the oldest values. Therefore, the cache clients 110 should typically treat the in-memory distributed cache 116 as a transitory cache. The cache clients 110 should not assume that data stored in distributed cache 116 will still be in the distributed cache 116 at the time the data is needed.

One specific example of a component for implementing an in-memory distributed cache 116 is the MEMCACHED open source distributed in-memory object caching system, originally developed by DANGA INTERACTIVE. In this regard, it should be appreciated that the embodiments disclosed herein might be implemented in conjunction with a distributed cache 116 implemented utilizing MEMCACHED. It should also be appreciated that the concepts presented herein might be implemented with other types of in-memory object caching systems from other developers.

It should be appreciated that the operating environment 100 shown in FIG. 1 has been simplified for discussion purposes and that many more computing, networking, and power components might be utilized than shown in FIG. 1. Moreover, it should also be appreciated that the operating environment 100 shown in FIG. 1 is merely illustrative, and that the various caching improvements disclosed herein might be utilized in many different environments and configurations. Additional details regarding the various components shown in FIG. 1 will be provided below.

FIGS. 2A-2D are software architecture diagrams showing aspects of the operation of a cache get method, a claim fetching method, a cache add method, and a cache wait method, respectively, that are exposed by a cache server component 120 in an in-memory distributed cache 116 in one embodiment disclosed herein. Each of these methods will be described below with reference to its respective FIG.

Figure 2A:
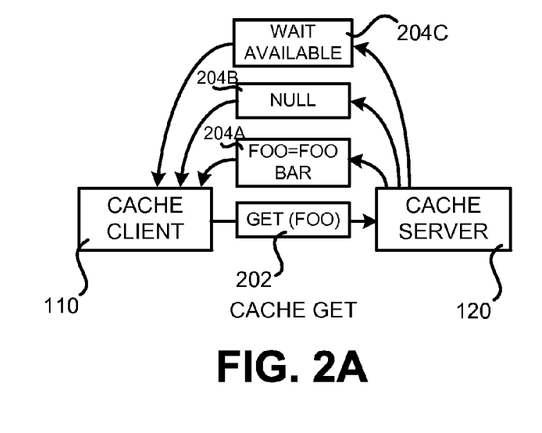
FIGS. 2A-2D are software architecture diagrams showing aspects of the operation of a cache get method, a claim fetching method, a cache add method, and a cache wait method, respectively, that are exposed by a cache server in a distributed cache in one embodiment disclosed herein.

FIG. 2A illustrates aspects of the operation of a cache get method exposed by the cache server 120 in one embodiment. A cache client 110 can call the cache get method exposed by the cache server 120 to retrieve a value stored in the distributed cache 116. For instance, in the example shown in FIG. 2A, the cache client 110 has transmitted a call 202 to the cache get method exposed by the cache server 120 for the value associated with the cache key 'FOO.'

In response to receiving the call 202, the cache server 120 determines whether the requested key is in the distributed cache 116. If the requested key is in the distributed cache 116, the cache server 120 retrieves the value associated with the key from the distributed cache 116 and returns the value in response to the call. In the example shown in FIG. 2A, for instance, the cache server 120 might return a response 204A indicating that the key 'FOO'='FOOBAR' if the value 'FOOBAR' is stored in the distributed cache 116 for the key 'FOO.' If the cache server 120 determines that the requested value is not in the distributed cache 116, the cache server will return a response 204B with a null value or another type of value indicating that the requested value is not in the distributed cache 116.

According to embodiments presented herein, the cache server 120 might also be configured to return a "wait available" response 204C indicating that the cache client 110 may wait for the requested value to become available in the distributed cache 116 in certain circumstances. In particular, the cache server 120 might instruct cache clients 110 that they can wait for a value to become available in the distributed cache 116 when a requested key is not in the cache and when one or more other cache clients 110 have indicated that they are fetching the requested value. The number of cache clients 110 that must indicate that they are fetching the requested value before the cache server 120 will provide the wait available response 204C may be user-configurable. For example, an administrator of the distributed cache 116 might specify that 20 cache clients 110 must indicate that they are fetching the requested value before another cache client 110 will be permitted to wait on the requested value.

Figure 2B:
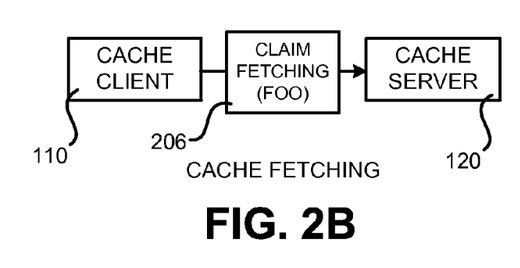

As shown in FIG. 2B, the cache server 120 might also be configured to expose a claim fetching method. The claim fetching method allows a cache client 110 to indicate to the cache server 120 that the cache client 110 is going to fetch a requested key. For instance, in the example shown in FIG. 2B, the cache client 110 has transmitted a call 206 to the claim fetching method exposed by the cache server 120 indicating that the cache client 110 is fetching the key 'FOO.' In response to receiving such a call, the cache server 120 might increment a variable utilized to keep track of the number of cache clients 110 that are fetching a particular key. As discussed above with regard to FIG. 2A, this variable might be utilized to determine whether a wait available response 204C may be provided to cache clients 110 when a requested value is not in the distributed cache 116.

If a cache client 110 desires to wait on a requested key to appear in the distributed cache 116, rather than fetching the key, the cache client 110 may transmit a call 210 to a wait cache method exposed by the cache server 120 in one embodiment. For instance, in the example shown in FIG. 2D, the cache client 110 has transmitted a call 201 to the wait cache method exposed by the cache server 120. In response thereto, the cache server 120 adds the calling cache client 110 to a list, or other type of data structure, that identifies each of the cache clients 110 that are waiting on the particular key. In the example shown in FIG. 2D, for instance, the cache server 120 may add the cache client 110 to a list identifying the clients that are waiting for the key 'FOO.'

Figure 2C:
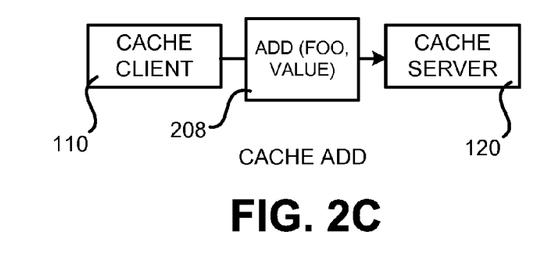
Figure 2D:
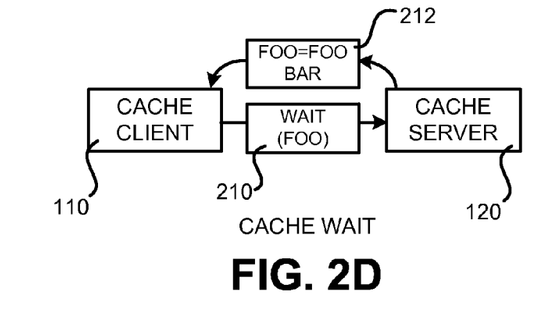

The cache server 120 is also configured to expose a cache add method through which cache clients 110 can add key/value pairs to the distributed cache 116. For example, as shown in FIG. 2C, a cache client 110 might submit a call 208 to the cache add method in order to add a key and its associated value to the distributed cache 116. When a cache client 110 adds a key to the distributed cache 116, the cache server 120 examines the list (or other type of data structure) associated with the submitted key to determine if any other cache clients 110 are awaiting the newly submitted value.

If other cache clients 110 are awaiting the new value, the cache server 120 provides the value to the waiting cache clients 110. For example, the cache server 120 might provide a callback to the waiting cache clients 110 with the newly added value. In the example shown in FIG. 2D, for instance, the cache server 120 has provided a callback 212 to the cache client 110 with the value 'FOOBAR.' It should be appreciated that mechanisms other than a callback might be utilized in order to provide values to the waiting cache clients 110. Additional details regarding the various methods exposed by the cache server 120 will be described below with regard to FIGS. 3-6.

Figure 3:
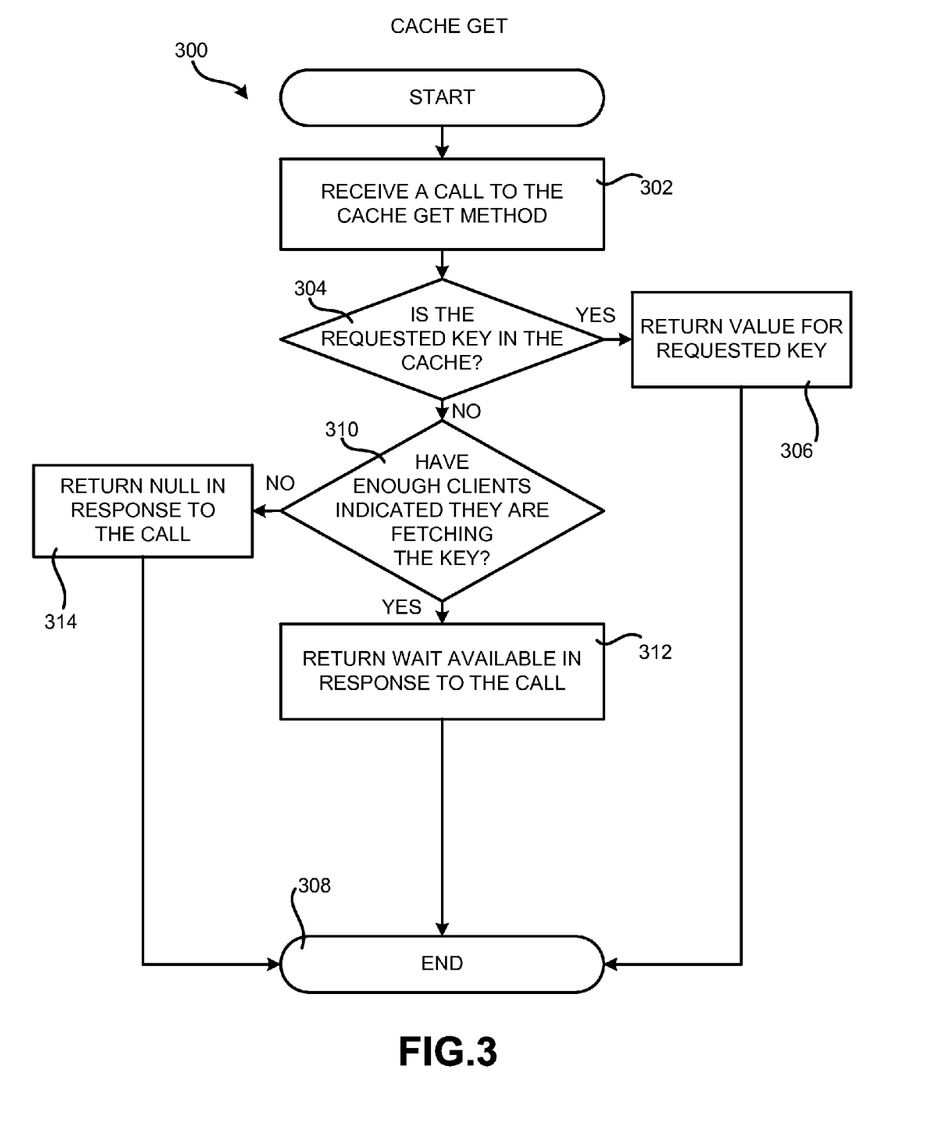
FIG. 3 is a flow diagram showing an illustrative routine that shows aspects of the operation of a cache server for processing a call to a cache get method, according to one embodiment disclosed herein.

FIG. 3 is a flow diagram showing an illustrative routine 300 that details aspects of the operation of a cache server 120 for processing a call to a cache get method, according to one embodiment disclosed herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 300 begins at operation 302, where a cache server 120 in the distributed cache 116 receives a call to its cache get method. As discussed above, the cache get method allows a cache client 110 to request a value from the in-memory distributed cache 116. In order to request the value, the requesting cache client 110 provides a key to the cache server 120 as a part of the call to the cache get method.

From operation 302, the routine 300 proceeds to operation 304. At operation 304, the cache server determines whether the requested key is in the distributed cache 116. If the specified key has an associated value in the cache, the routine 300 proceeds from operation 304 to operation 306, where the cache server 120 returns the value stored in the distributed cache 116 to the requesting cache client 120 in response to the request. If, however, the specified key does not have an associated value stored in the cache, the routine 300 proceeds from operation 303 to operation 310.

At operation 310, the cache server 120 determines whether a predefined, and possibly user-configurable, number of cache clients 120 have previously indicated that they are fetching the requested value. As mention above, and as will be described in greater detail below with regard to FIG. 4, the cache server 120 might expose a claim fetching method through which a cache client 110 can provide such an indication.

If the cache server 120 determines that the required number of cache clients 110 have not indicated that they are fetching the requested value, then the routine 300 proceeds from operation 310 to operation 314. At operation 314, the cache server 120 returns a null value in response to the request, thereby indicating to the calling cache client 110 that the requested value is not stored in the distributed cache 116. The routine 300 then proceeds from operation 314 to operation 308, where it ends.

If, at operation 310, the cache server 120 determines that the required number of cache clients 110 have indicated that they are fetching the requested value, the routine 300 proceeds from operation 310 to operation 312. At operation 312, the cache server 120 provides an indication in response to the request that the requesting cache client 110 can wait for the requested value to become available in the distributed cache 116. If the cache client 110 chooses to wait, the cache client 110 may make a call to the cache wait method exposed by the cache client 120. Details regarding the operation of the cache wait method will be provided below with regard to FIG. 5.

Figure 4:
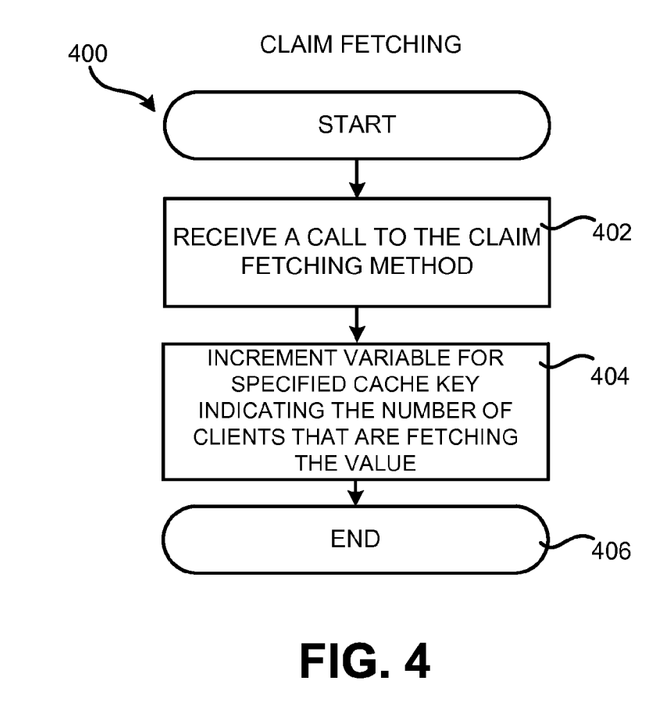
FIG. 4 is a flow diagram showing an illustrative routine that shows aspects of the operation of a cache server for processing a call to a claim fetching method, according to one embodiment disclosed herein.

FIG. 4 is a flow diagram showing an illustrative routine 400 that shows aspects of the operation of a cache server 120 for processing a call to a claim fetching method, according to one embodiment disclosed herein. The routine 400 begins at operation 402, where the cache server 120 receives a call to its claim fetching method. In response to receiving such a call, the routine 400 proceeds from operation 402 to operation 404.

At operation 404, the cache server 120 increments a variable utilized to keep track of the number of cache clients 110 that have indicated that they are fetching the value. Until the variable reaches a predefined value, a null value will be returned to cache clients 110 requesting the same value. After the variable has reached the predefined value, cache clients 110 will be permitted to wait on the requested value in the manner described below with regard to FIG. 5. By requiring a certain number of cache clients 110 to indicate that they are fetching the value prior to permitting other cache clients 110 to wait, the cache server 120 can increase the likelihood that at least one of the fetching clients 110 will in fact add the value to the distributed cache 116. From operation 404, the routine 400 proceeds to operation 406, where it ends.

Figure 5:
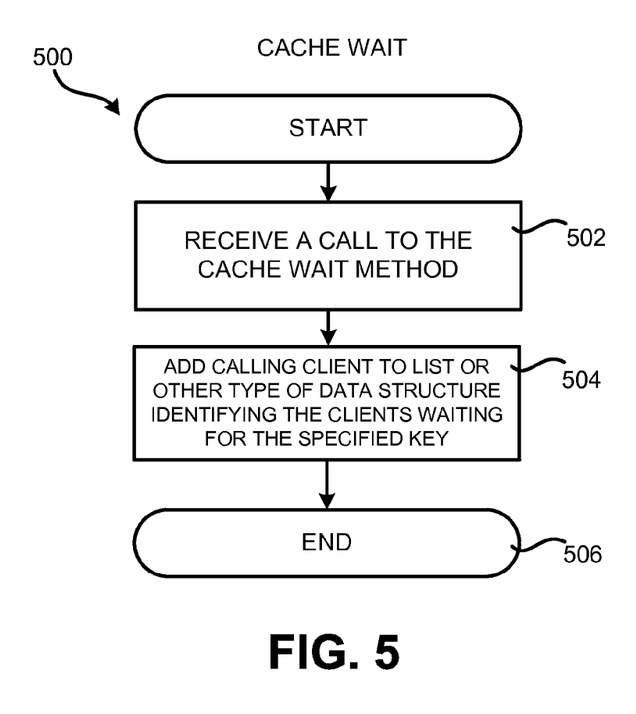
FIG. 5 is a flow diagram showing an illustrative routine that shows aspects of the operation of a cache server for processing a call to a cache wait method, according to one embodiment disclosed herein.

FIG. 5 is a flow diagram showing an illustrative routine 500 that shows aspects of the operation of a cache server 102 for processing a call to a cache wait method, according to one embodiment disclosed herein. The routine 500 begins at operation 502, where the cache server 120 receives a call to its cache wait method from a cache client 110 desiring to wait on a cache key to become available in the distributed cache 116.

In response to receiving such a call, the routine 500 proceeds from operation 502 to operation 504, where the cache server 120 adds the identity of the calling cache client 110 to a list, or other type of data structure, utilized to store data identifying each of the cache clients 110 that are waiting for the requested value. As described briefly above, and as will be described in detail below with regard to FIG. 6, the cache server 120 may call the cache client 110 back with the requested value when another cache client 110 adds the value to the distributed cache 116. From operation 504, the routine 500 proceeds to operation 506, where it ends.

Figure 6:
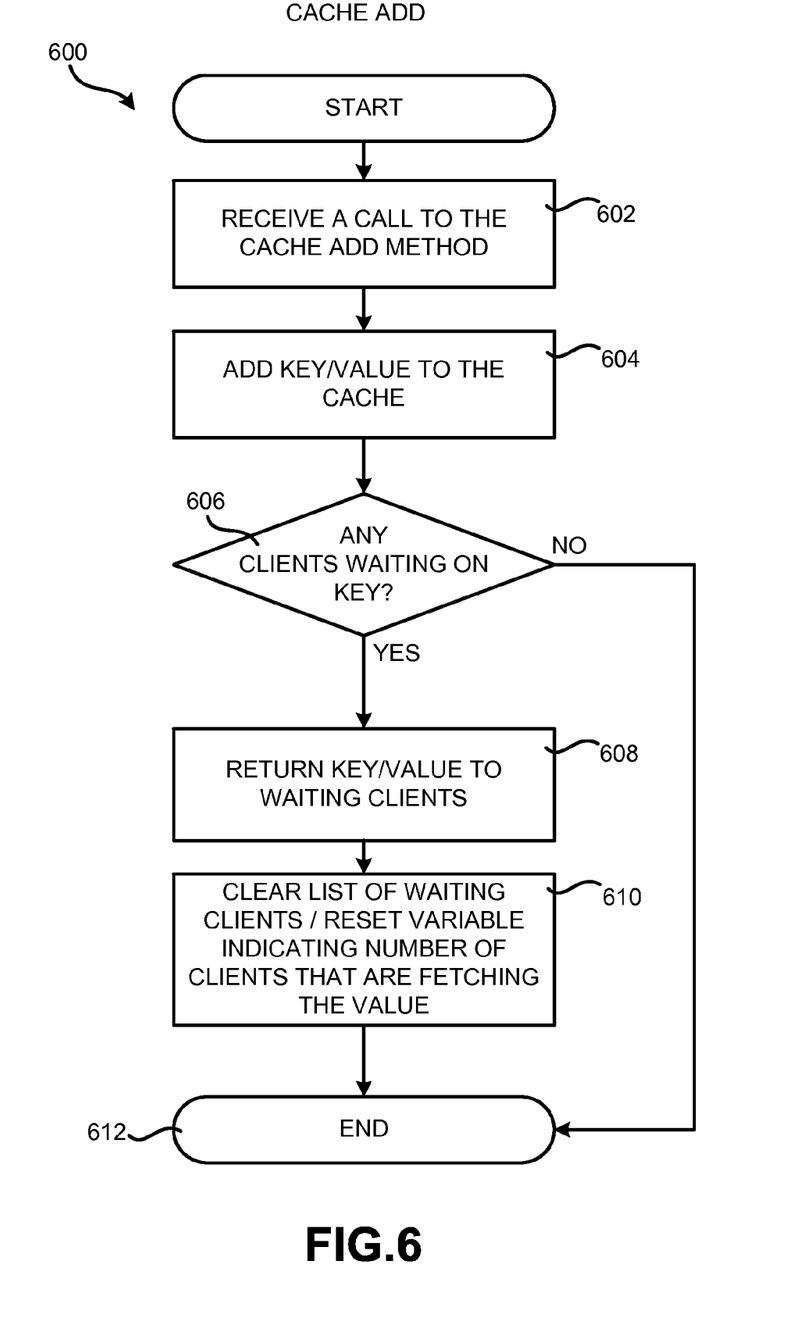
FIG. 6 is a flow diagram showing an illustrative routine that shows aspects of the operation of a cache server for processing a call to a cache add method, according to one embodiment disclosed herein.

FIG. 6 is a flow diagram showing an illustrative routine 600 that shows aspects of the operation of a cache server 120 for processing a call to a cache add method, according to one embodiment disclosed herein. The routine 600 begins at operation 602, where a cache server 120 receives a call to its cache add method. In response to receiving such a call, the routine 600 proceeds from operation 602 to operation 604, where the cache server 120 adds the cache key and value supplied with the request to the distributed cache 116. The routine 600 then proceeds from operation 604 to operation 606.

At operation 606, the cache server 120 determines whether any cache clients 110 are waiting on the cache key just added to the distributed cache 116. As mentioned above, this determination may be made by examining the list or other type of data structure utilized to keep track of the cache clients 110 waiting on particular cache keys. If no cache clients 110 are awaiting the cache key, the routine 600 proceeds from operation 606 to operation 612, where it ends. If, however, one or more cache clients 110 are awaiting the newly added cache key, the routine 600 proceeds from operation 606 to operation 608.

At operation 608, the cache server 120 returns the newly added value to the waiting cache clients 110. As mentioned above, a call back or another type of mechanism might be utilized to provide the cache key to the waiting cache clients 110. Once the cache key has been provided to the waiting cache clients 110, the routine 600 proceeds from operation 608 to operation 610.

At operation 610, the cache server 120 clears the list of cache clients 110 waiting for the cache key. The cache server 120 also resets the variable utilized to keep track of the number of cache clients 110 indicating that they are fetching the cache key. From operation 610, the routine 600 proceeds to operation 612, where it ends.

Figure 7:
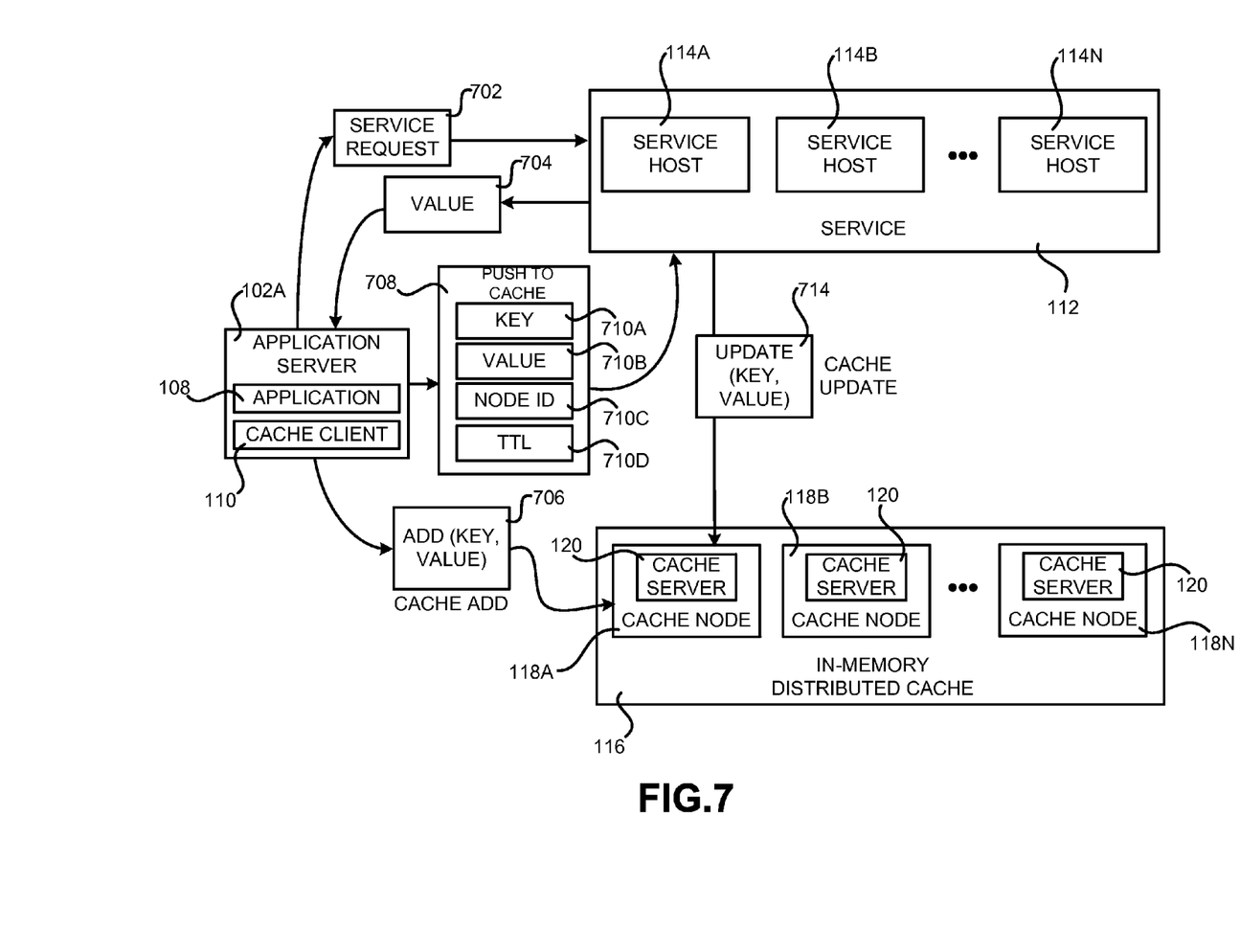
FIG. 7 is a system diagram showing aspects of one implementation disclosed herein in which a service is configured to expose a push to cache method for configuring the service to directly push updated values directly into an in-memory distributed cache.

FIG. 7 is a system diagram showing aspects of one implementation disclosed herein in which a service 112 is configured to expose a push to cache method for configuring the service 112 to directly push updated values directly into an in-memory distributed cache 116. The push to cache method allows a caller to request that a value for a specified cache key be updated in the distributed cache 116 if the value changes. For instance, in the example shown in FIG. 7, an instance of the application 108 might transmit a service request 702 to the service 112. In response to the request, the service 112 might provide a value 704. The value 704 might be a parameter for configuring the operation of the application 108, for instance.

In response to receiving the value 704, the application 108 might then cause the received value 704 to be stored in a cache, such as the in-memory distributed cache 116, utilizing an appropriate mechanism, such as by making a call 706 to the cache add method described above. One of the cache nodes 118 in the distributed cache 116 will then store the specified value 704. For example, in FIG. 7, the cache node 118A stores the value 704.

In a typical installation, the value 704 stored in the distributed cache 116 will be invalidated after its associated TTL value expires. At that time, the application 108 will need to request an updated value from the service 112 and to store the updated value in the distributed cache 116. This process may continue indefinitely. The mechanism described below allows the application 108 to instruct the service 112 to update the value 704 in the distributed cache 116 each time the value 704 changes. Through this mechanism, the repeated calls from the application 108 to the service 112 for changed values can be avoided.

In order to provide this functionality, the service 112 may expose a push to cache method through which a caller can request that updated values be pushed by the service 112 directly into the distributed cache 116. For instance, in the example shown in FIG. 7, the application 108 has transmitted a call 708 to the push to cache method exposed by the service 112. The call 708 includes a field 710B storing the value 704 to be updated and a field 710A storing the cache key associated with the value 704. The call 708 might also include a field 710C storing a node ID that identifies the node 118A in the distributed cache 116 that is storing the cache key for the value 704, and a field 710D storing a TTL value specifying a lifetime for the request 708.

When the service 112 receives the call 708 to the push to cache method, it stores the cache key, the value, the node ID, and the TTL value if provided. The service 112 then periodically determines whether the value 704 has changed. For example, the service 112 might periodically recompute the value 704, retrieve the value 704 from another service or system, or perform other types of processing in order to determine whether the value 704 originally supplied in the request 708 has changed. The service 112 might also register for and receive an event indicating that the value 704 has changed.

If the service 112 determines that the value 704 has changed, the service then causes the value 704 previously stored in the distributed cache 116 to be updated with the changed value. For example, the service 112 may transmit a call 714 to an update key method on the cache server 120 of the cache node 118A to submit the changed value. This process may continue until the specified TTL for the request 708 has expired. In this way, the application 108 can avoid having to continually retrieve the updated value from the service 112 and re-store the value in the distributed cache 116 in the event of a cache miss. Additional details regarding this process will be provided below with regard to FIG. 8.

Figure 8:
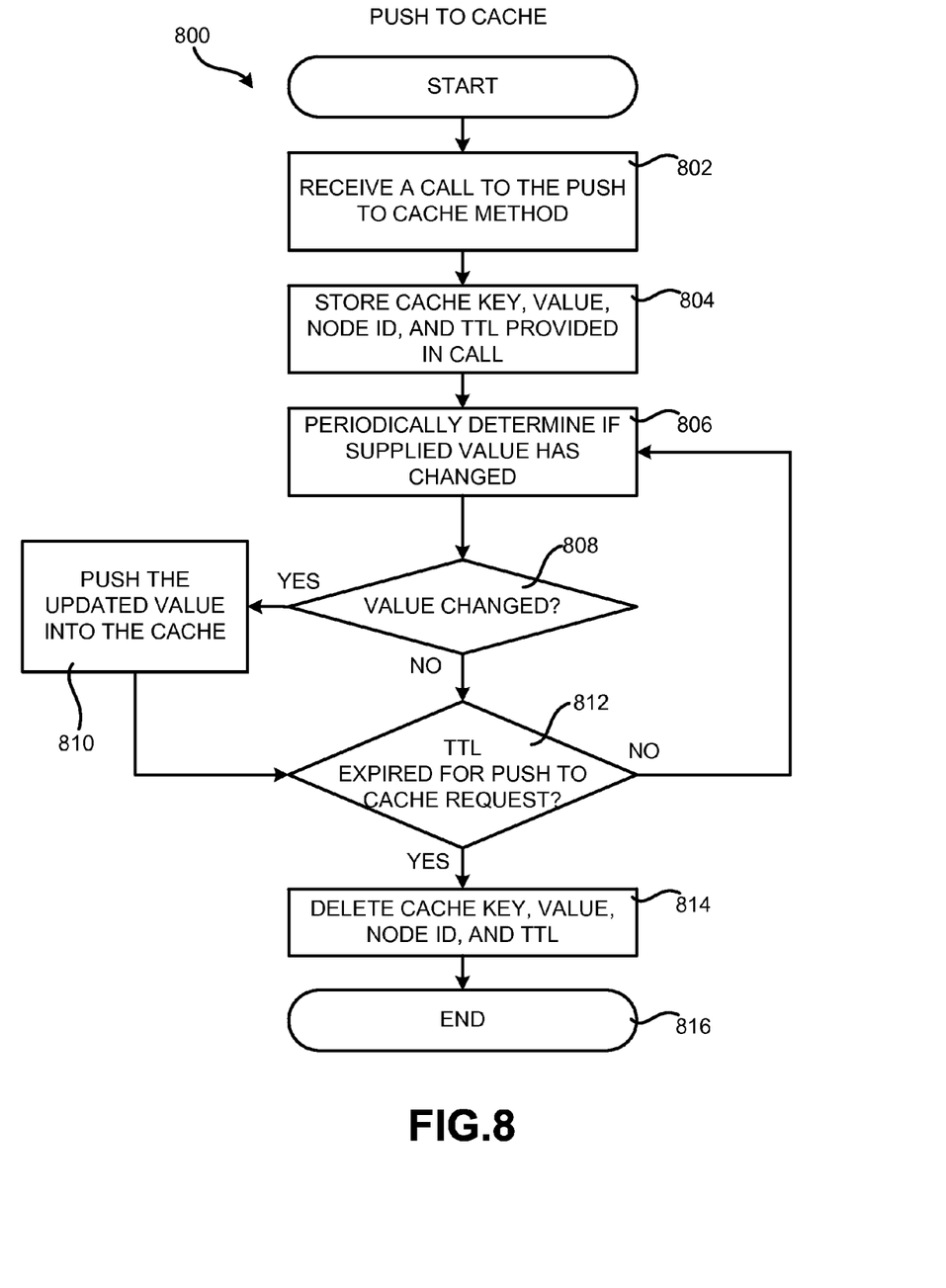
FIG. 8 is a flow diagram showing an illustrative routine that shows aspects of the operation of a service host for processing a call to a push to cache method, according to one embodiment disclosed herein.

FIG. 8 is a flow diagram showing an illustrative routine 800 that shows aspects of the operation of a service host for processing a call to a push to cache method, according to one embodiment disclosed herein. The routine 800 begins at operation 802, where the service 112 receives a call 708 to its push to cache method. In response to receiving the call, the routine 800 proceeds from operation 802 to operation 804.

At operation 804, the service stores the cache key, value, node ID, and TTL value provided in the fields 710A-710D of the call 708. These values are utilized to update the value when the value changes in the manner described below. From operation 804, the routine 800 proceeds to operation 806, where the service 112 periodically determines whether the value specified in the call 708 has changed. As discussed above, the service 112 might periodically recompute the value 704, retrieve the value 704 from another service or system, or perform other types of processing in order to determine whether the value 704 originally supplied in the request 708 has changed. The service 112 might also register for and receive an event indicating that the value 704 has changed. From operation 806, the routine 800 proceeds to operation 808.

At operation 808, the service 112 determines whether the value has changed. If the value has changed, the routine 800 proceeds from operation 808 to operation 810. At operation 810, the service 112 transmits a call 714 to the cache update method of the cache node 118 where the value is stored in order to update the stored value in the distributed cache 116. The routine 800 then proceeds from operation 810 to operation 812.

If, at operation 808, the service 112 determines that the value has not changed, the routine 800 proceeds from operation 808 to operation 812. At operation 812, the service 112 determines whether the TTL for the push to cache request specified in the field 710D of the call 708 has expired. If the TTL has not expired, the routine 800 proceeds from operation 812 to operation 806, where updates to the value may be continually pushed into the distributed cache 116 in the manner described above.

If, at operation 812, the service 112 determines that the TTL for the push to cache request has expired, the service 112 deletes the cache key, value, node ID, and TTL stored at operation 804, described above. In this manner, no further updating of the value in the distributed cache 116 will occur. From operation 814, the routine 800 proceeds to operation 816, where it ends.

Figure 9:
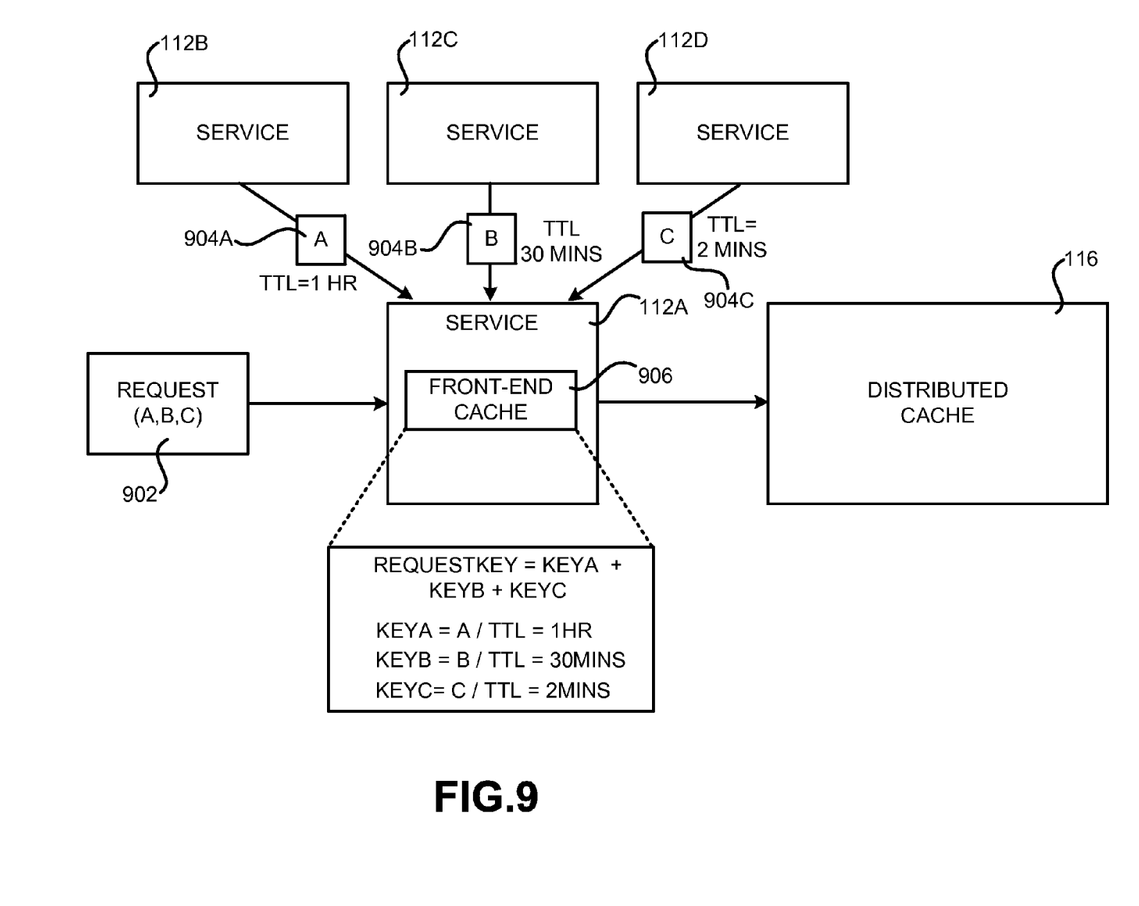
FIG. 9 is a system diagram showing aspects of one embodiment disclosed herein, in which cache keys are stored along with information describing any dependencies between the cache keys.

FIG. 9 is a system diagram showing aspects of another embodiment disclosed herein, in which cache keys are stored along with information describing any dependencies between the cache keys. As will be described in greater detail below, when a cache key is invalidated, such as based upon an associated TTL value, the stored dependency information may be utilized to invalidate other cache keys that are dependent upon the invalidated cache key. Storing and invalidating cache keys in this way may avoid unnecessary service calls in certain implementations. Details regarding this process will be provided below with regard to FIGS. 10 and 11.

As illustrated in FIG. 9, a service 112A might utilize multiple other services 112B-112D to obtain information for responding to certain types of requests. For instance, in the example shown in FIG. 9, the service 112A has received a request 902 for three data values (A, B, and C). In order to satisfy the request 902, the service 112A utilizes the service 112B to obtain the value 904A (A), utilizes the service 112C to obtain the value 904B (B), and utilizes the service 112D to obtain the value 904C (C). Once the service 112A has obtained the values 904A-904C from the services 112B-112D, the service 112A can provide a response to the request 902.

As also shown in FIG. 9, the service 112A maintains a "front-end" cache 906. The front-end cache 906 is typically utilized to cache the results for entire requests, such as for the request 902. Accordingly, in a typical implementation, the service 112A will store a single key in the front-end cache 906 and an associated value for the request 902. In this case, the key would be associated with all of the values 904A-904C. The individual values 904A-904C might also be cached separately in the distributed cache 116 in the manner described above.

As also illustrated in FIG. 9, each of the values 904A-904C retrieved from the services 112B-112D has a different TTL value. In particular, the value 904A has an associated TTL of one hour, the value 904B has an associated TTL of 30 minutes, and the TTL for the value 904C is 2 minutes. The TTL for the cache key corresponding to the entire request 902 is typically set to be the minimum of the TTL values for data retrieved from the services 112B-112D. As a result, the TTL value for the cache key corresponding to the request 902 would be set at two minutes (i.e. the TTL of the value 904C retrieved from the service 112D).

When the TTL (i.e. 2 minutes) for the cache key corresponding to the request 902 expires, this cache key is invalidated. Accordingly, when a subsequent request is received that is identical to the request 902, it will be necessary to again retrieve the values 904A-904C from the services 112B-112D, respectively. This will be true even though it may be unlikely that the values 904A and 904B have changed if the subsequent request is received shortly after the TTL for the value 904C expires. Consequently, unnecessary service calls may be made to the services 112B and 112C utilizing such a mechanism for caching the entire request 902. These calls utilize valuable network bandwidth and central processing unit ("CPU") cycles.

One embodiment disclosed herein includes a mechanism for avoiding the unnecessary service calls described above. In particular, according to this mechanism, separate keys are stored in the front-end cache 906 for each of the values 904A-904C, each having its own associated TTL value. For instance, in the example shown in FIG. 9, the cache key 'KEYA' has been stored in the front-end cache 906 for the value 904A, along with a TTL of one hour. Similarly, the key 'KEYB' has been stored in the front-end cache 906 for the value 904B, along with a TTL of thirty minutes. Likewise, the key 'KEYC' has been stored in the front-end cache 906 for the value 904C, along with a TTL of two minutes.

In addition to the separate cache keys stored in the front-end cache 906 for each of the values 904A-904C, a cache key is also stored in the front-end cache 906 corresponding to the request 902. The cache key for the request 902 is associated with the cache keys for the values 904A-904C. In the example shown in FIG. 9, for instance, a cache key 'REQUESTKEY' has been stored in the front-end cache 906 that includes the cache key 'KEYA' for the value 904A, the cache key 'KEYB' for the value 904B, and the cache key 'KEYC' for the value 904C. The cache key for the request 902 might also be given its own unique TTL value that is not dependent upon the TTL values associated with the values 904A-904C. By storing the cache key for the request 902 in this manner, a dependency graph is created in the front-end cache 906 indicating that the value of the request 902 is dependent upon the values 904A-904C, also stored in the cache.

Storing cache keys and dependency information in the front-end cache 906 in the manner described above, allows the cache keys for the values 904A-904C to be invalidated individually. Moreover, storing the cache keys and the dependency information in the manner described above also allows cache keys to be invalidated at the time that cache keys upon which they are dependent are invalidated. For instance, using the example presented above, the cache key for the value 904C might be invalidated after two minutes. As a result, the cache key for the request 902 will also be invalidated because it is dependent upon the cache key associated with the value 904C, which has been invalidated.

The cache keys for the values 904A and 904B are not, however, invalidated when the cache key associated with the value 904C is invalidated. As a result, when the service 112A receives a subsequent request that is identical to the request 902, the service 112A will query the front-end cache 906 and the front-end cache 906 will return null values for the cache key corresponding to the request and for the cache key corresponding to the value 904C. However, the front-end cache 906 will return the cached values 904A and 904B. In this way, the service 906 only needs to perform a service call to the service 112D to obtain an updated value for the value 904C and can then generate a response to the request. The unnecessary calls to the services 112B and 112C described above are avoided through the use of this mechanism. Additional details regarding the operation of this mechanism will be provided below with regard to FIGS. 10 and 11.

Figure 10:
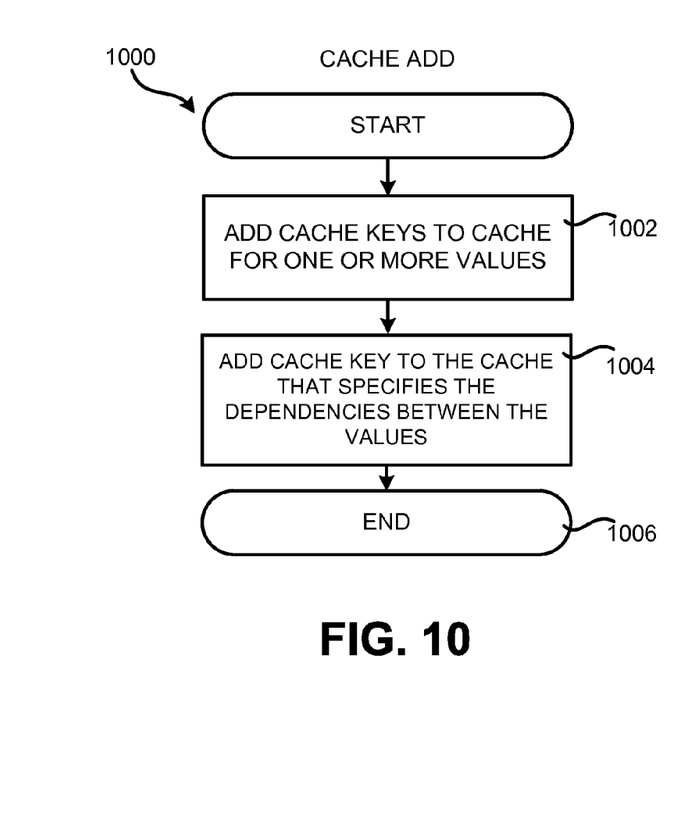
FIG. 10 is a flow diagram showing an illustrative routine that shows aspects of the mechanism described above with regard to FIG. 9 for performing a cache add operation that specifies dependencies between added values, according to one embodiment disclosed herein.

FIG. 10 is a flow diagram showing an illustrative routine 1000 that shows aspects of the mechanism described above with regard to FIG. 9 for performing a cache add operation that specifies dependencies between added values, according to one embodiment disclosed herein. The routine 1000 begins at operation 1002, where a service 112A adds one or more cache keys to a cache, such as the front-end cache 906 shown in FIG. 9. For instance, in the example described above with regard to FIG. 9, the service 112A may add the 'KEYA' cache key corresponding to the value 904A, the 'KEYB' cache key corresponding to the value 904B, and the 'KEYC' cache key corresponding to the value 904C. As discussed above, TTL values might also be specified for each of these cache keys and stored in the cache.

From operation 1002, the routine 1000 proceeds to operation 1004, where another cache key is added to the cache 906 that defines a dependency graph utilizing the cache keys stored at operation 1002. For instance, in the example described above with regard to FIG. 9, a cache key 'REQUESTKEY' has been stored in the front-end cache 906 that includes the cache key 'KEYA' for the value 904A, the cache key 'KEYB' for the value 904B, and the cache key 'KEYC' for the value 904C. This creates a dependency graph indicating that the cache key for the request 902 is dependent upon the three specified cache keys. As mentioned above, the cache key for the request 902 might also be given its own unique TTL value that is not dependent upon the TTL values associated with the values 904A-904C. From operation 1004, the routine 1000 proceeds to operation 1006, where it ends.

Figure 11:
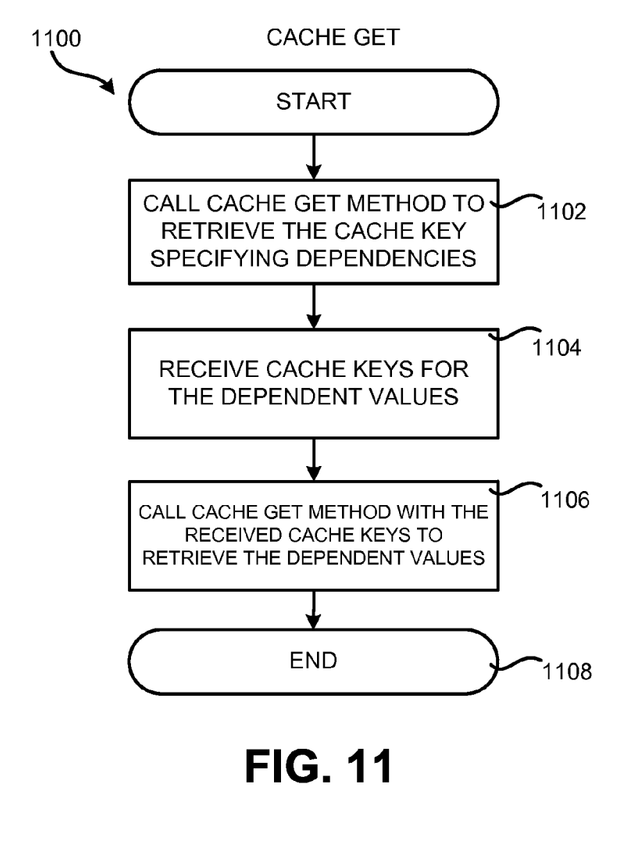
FIG. 11 is a flow diagram showing an illustrative routine that shows aspects of the mechanism described above with regard to FIG. 9 for performing a cache get operation for data added to a cache with specified dependencies, according to one embodiment disclosed herein.

FIG. 11 is a flow diagram showing an illustrative routine 1100 that shows aspects of the mechanism described above with regard to FIG. 9 for performing a cache get operation for data added to a cache 906 with specified dependencies, according to one embodiment disclosed herein. The routine 1100 begins at operation 1102, where a call is made to the cache get method to obtain the cache key that specifies the dependency graph. For instance, in the example described above with regard to FIG. 9, a call would be made to the cache get method for the 'REQUESTKEY' cache key. As mentioned above, the cache keys for all values upon which the request 902 is dependent will be returned in response to the call at operation 1104.

From operation 1104, the routine 1100 proceeds to operation 1106, where additional calls are made to the cache get method for each of the cache keys obtained above at operation 1104. As discussed above, if any of the cache keys have been invalidated, a null value will be returned. In the example described above with regard to FIG. 9, the service 112A will then obtain updated values for any invalidated keys by calling the appropriate services 112B-112D. The service 112A can then satisfy the request 902. From operation 1106, the routine 1100 proceeds to operation 1108, where it ends.

Figure 12:
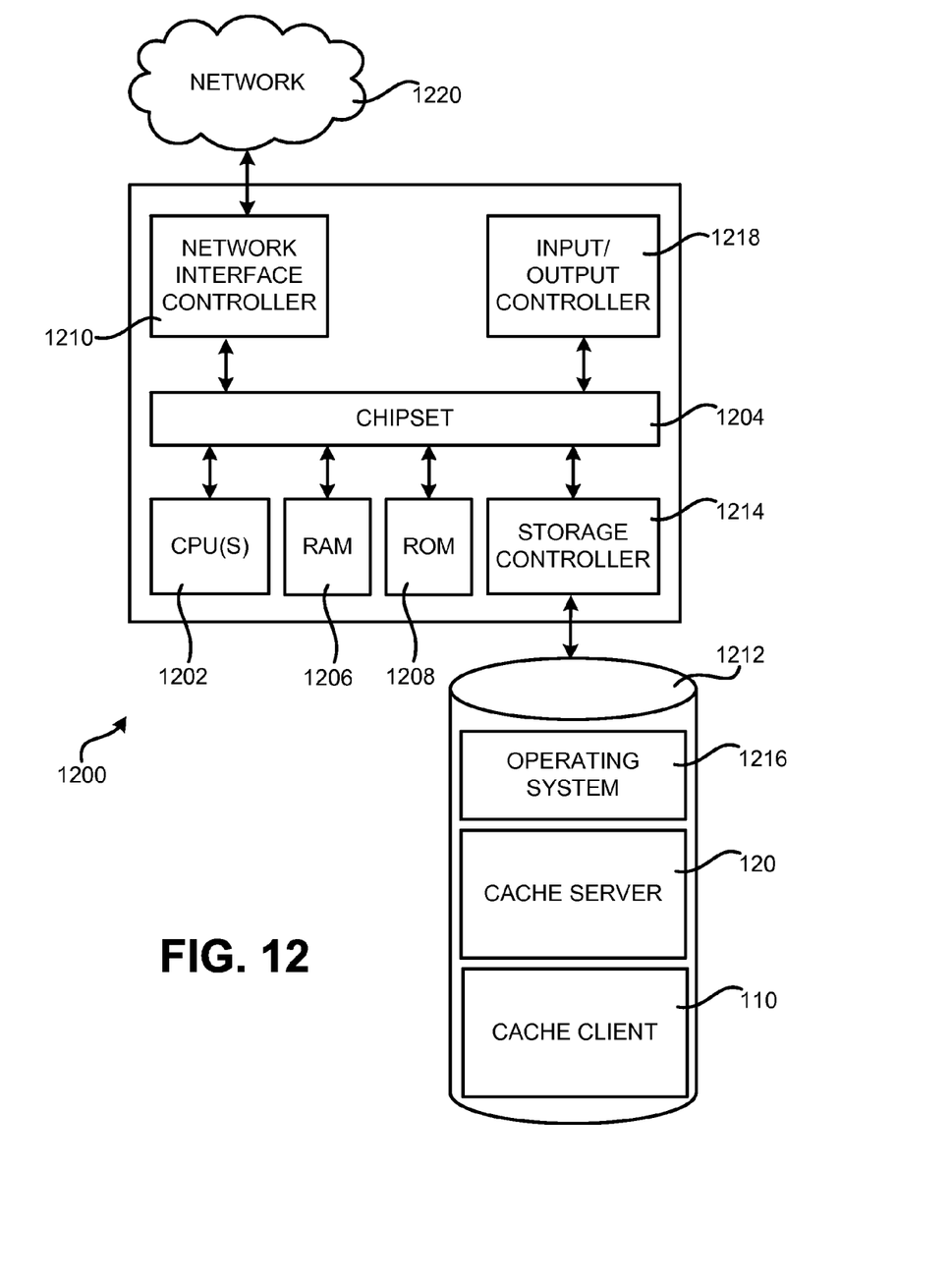
FIG. 12 is a computer architecture diagram showing one illustrative computer hardware architecture for use in computing devices configured to implement the technologies disclosed herein in one embodiment.

FIG. 12 shows an example computer architecture for a computer 1200 capable of executing the software components described above. The computer architecture shown in FIG. 12 illustrates a conventional server computer, workstation, desktop computer, laptop, electronic book reader, digital wireless phone, tablet computer, network appliance, set-top box, or other computing device. The computer architecture shown in FIG. 12 may be utilized to execute any aspects of the software components described above.

The computer 1200 includes a baseboard, or "motherboard," which is a printed circuit board to which a multitude of components or devices may be connected by way of a system bus or other electrical communication paths. In one illustrative embodiment, one or more central processing units ("CPUs") 1202 operate in conjunction with a chipset 1204. The CPUs 1202 are standard programmable processors that perform arithmetic and logical operations necessary for the operation of the computer 1200.

The CPUs 1202 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1204 provides an interface between the CPUs 1202 and the remainder of the components and devices on the baseboard. The chipset 1204 may provide an interface to a random access memory ("RAM") 1206, used as the main memory in the computer 1200. The chipset 1204 may further provide an interface to a computer-readable storage medium such as a read-only memory ("ROM") 1208 or non-volatile RAM ("NVRAM") for storing basic routines that help to startup the computer 1200 and to transfer information between the various components and devices. The ROM 1208 or NVRAM may also store other software components necessary for the operation of the computer 1200 in accordance with the embodiments described herein.

According to various embodiments, the computer 1200 may operate in a networked environment using logical connections to remote computing devices and computer systems through a network, such as a local-area network ("LAN"), a wide-area network ("WAN"), the Internet, or any other networking topology known in the art that connects the computer 1200 to remote computers. The chipset 1204 includes functionality for providing network connectivity through a network interface controller ("NIC") 1210, such as a gigabit Ethernet adapter.

For example, the NIC 1210 may be capable of connecting the computer 1200 to other computing devices over a network 1220, such as a local area network ("LAN") or a wide area network ("WAN") such as the Internet. It should be appreciated that multiple NICs 1210 may be present in the computer 1200, connecting the computer to other types of networks and remote computer systems.

The computer 1200 may be connected to a mass storage device 1212 that provides non-volatile storage for the computer. The mass storage device 1212 may store system programs, application programs, other program modules, and data, which have been described in greater detail herein. The mass storage device 1212 may be connected to the computer 1200 through a storage controller 1214 connected to the chipset 1204. The mass storage device 1212 may consist of one or more physical storage units. The storage controller 1214 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 1200 may store data on the mass storage device 1212 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1212 is characterized as primary or secondary storage, or the like.

For example, the computer 1200 may store information to the mass storage device 1212 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1212 by detecting the physical states or characteristics of one or more particular locations within the physical storage units.

In addition to the mass storage device 1212 described above, the computer 1200 might have access to other computer-readable media to store and retrieve information, such as program modules, data structures, or other data. It should be appreciated by those skilled in the art that computer-readable media can be any available media that may be accessed by the computer 1200, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1212 may store an operating system 1216 utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1212 may store other system or application programs and data utilized by the computer 1200. For instance, when utilized to implement a cache node 118, the mass storage device 1212 might store the cache server component 120. When utilized to implement an application server 102, the mass storage device 1212 might store the cache client component 110. The mass storage device 1212 might also store other types of programs and data when utilized to implement other computing systems.

In one embodiment, the mass storage device 1212 or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1202 transition between states, as described above. According to one embodiment, the computer 1200 has access to computer-readable storage media storing computer-executable instructions that, when executed by the computer, perform the various routines and operations described herein.

The computer 1200 may also include an input/output controller 1218 for receiving and processing input from a number of input devices, such as a keyboard, a mouse, a touchpad, a touch screen, an electronic stylus, or other type of input device. Similarly, the input/output controller 1218 may provide output to a display device, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for providing an improved in-memory distributed cache have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for implementing a distributed cache, the method comprising executing instructions in a computer system to perform the operations of:
   receiving a request from a cache client for a requested value associated with a cache key;
   in response to receiving the request, searching for the requested value in the distributed cache;
   in response to determining that the requested value is not stored in the cache:
      determining a quantity of cache clients that are currently fetching the requested value, determining that the quantity of cache clients that are currently fetching the requested value meets or exceeds a predefined threshold number, determining, based at least in part on the quantity of cache clients that are currently fetching the requested value meeting or exceeding the predefined threshold number, that the cache client is permitted to wait for the requested value, and providing, to the cache client, an indication in response to the request that the cache client is permitted to wait for the requested value to become available in the distributed cache.

2. The computer-implemented method of claim 1, further comprising returning a null value as the indication in response to determining that the quantity of cache clients that are currently fetching the requested value does not meet or exceed the predefined threshold number.

3. The computer-implemented method of claim 1, wherein the indication is a first indication, the method further comprising:

receiving a second indication from the cache client that the cache client is waiting for the requested value to become available in the distributed cache; and in response to receiving the second indication, adding the cache client to a data structure containing data that identifies cache clients waiting for the requested value.

4. The computer-implemented method of claim 1, wherein the request is a first request, the cache client is a first cache client, the cache key is a first cache key, and the value is a first value, the method further comprising:

receiving a second request from a second cache client at a cache server to add a second cache key and a second value to the distributed cache;

in response to receiving the second request, adding the second cache key and the second value to the distributed cache, and determining based upon contents of a data structure that a third cache client is waiting on the second value; and in response to determining that the third cache client is waiting on the second value, providing the second value to the third cache client.

5. The computer-implemented method of claim 4, further comprising removing the third cache client from the data structure following the provision of the second value to the third cache client.

6. The computer-implemented method of claim 1, wherein the cache client is a first cache client, the cache key is a first cache key, and the value is a first value, the method further comprising:

receiving an indication from a second cache client indicating that the second cache client is fetching a value for a second cache key; and in response to receiving the indication that the second cache client is fetching a value for the second cache key, incrementing a variable associated with the second cache key that is utilized to keep track of a number of cache clients that are fetching the value for the second cache key.

7. The computer-implemented method of claim 1, wherein the predefined threshold number is user-configurable.

8. A computer-implemented method comprising executing instructions in a computer system to perform the operations of:

exposing, by a service, an application programming interface (API) configured to receive a request for the service to cause one or more updates to a value stored in a cache of a requesting entity, the request comprising the value and a cache key associated with the value as stored in the cache of the requesting entity;

determining that the value has changed to a new value; and transmitting, by the service and based on the value having changed, a cache update directly to the cache of the requesting entity, wherein the cache update causes a stored value in the cache of the requesting entity to be changed to the new value, wherein the service and the requesting entity are separate entities.

9. The computer-implemented method of claim 8, wherein the request further comprises identifying, by a node identifier (ID), a cache node in the cache of the requesting entity that is storing the stored value.

10. The computer-implemented method of claim 9, wherein transmitting the cache update comprises utilizing, by the service, the node ID provided with the request to cause the stored value to be updated by the cache node in the cache of the requesting entity that is storing the stored value.

11. The computer-implemented method of claim 8, wherein the request further comprises a time to live (TTL) value defining a TTL for the request.

12. The computer-implemented method of claim 11, wherein the operations for determining that the value has changed and transmitting the cache update are performed by the service only until the TTL specified with the request has expired.

13. The computer-implemented method of claim 8, wherein the cache of the requesting entity comprises an in-memory distributed cache comprised of a plurality of cache nodes.

14. A computer-implemented method for storing data in a cache, the method comprising executing instructions in a computer system to perform the operations of:

storing a first set of cache keys in the cache, individual keys of the first set of cache keys being associated with a corresponding value stored in the cache; and storing a second set of cache keys in the cache, individual keys of the second set of cache keys corresponding to a received request for two or more values, individual keys of the second set of cache keys comprising two or more corresponding cache keys of the first set of cache keys stored in the cache.

15. The computer-implemented method of claim 14, wherein the two or more corresponding cache keys are associated with cache keys for two or more corresponding values that a corresponding request is dependent upon.

16. The computer-implemented method of claim 14, wherein individual cache keys of the first set of cache keys has an assigned time to live (TTL) value stored in the cache.

17. The computer-implemented method of claim 16, further comprising:

invalidating one or more cache keys of the first set of cache keys based upon a corresponding TTL value; and in response to invalidating the one or more cache keys, utilizing a cache key of the second set of cache keys to invalidate one or more other cache keys that are dependent upon the invalidated one or more cache keys.

18. The computer-implemented method of claim 17, wherein the cache comprises an in-memory distributed cache.

19. The computer-implemented method of claim 17, wherein the cache comprises a front-end cache utilized by a service to cache request to the service.

20. The computer-implemented method of claim 19, wherein the first set of cache keys correspond to values obtained by the service from one or more other services for use in satisfying a request.

* * * * *